Oct. 13, 1931.  E. C. NOBLE  1,827,327

BELT CLAMP

Filed April 19, 1930

INVENTOR
*Elmer C. Noble*
BY *Arthur C. Brown.*
ATTORNEY

Patented Oct. 13, 1931

1,827,327

UNITED STATES PATENT OFFICE

ELMER C. NOBLE, OF TULSA, OKLAHOMA, ASSIGNOR OF ONE-HALF TO READE V. NOBLE, OF TULSA, OKLAHOMA

BELT CLAMP

Application filed April 19, 1930. Serial No. 445,606.

My invention relates to belt fasteners and more particularly to clamps of that character for connecting ends of belting to form a continuous band, the principal object of my invention being to provide a strong clamp for connecting the ends of heavy duty belts embodying means for obviating noise, slippage and wear incident to metal-to-metal contact of steel clamps with steel pulleys.

In accomplishing this and other objects of my invention, I have provided improved details of structure, the preferred form of which is illustrated in the accompanying drawings wherein.

Figure 1:
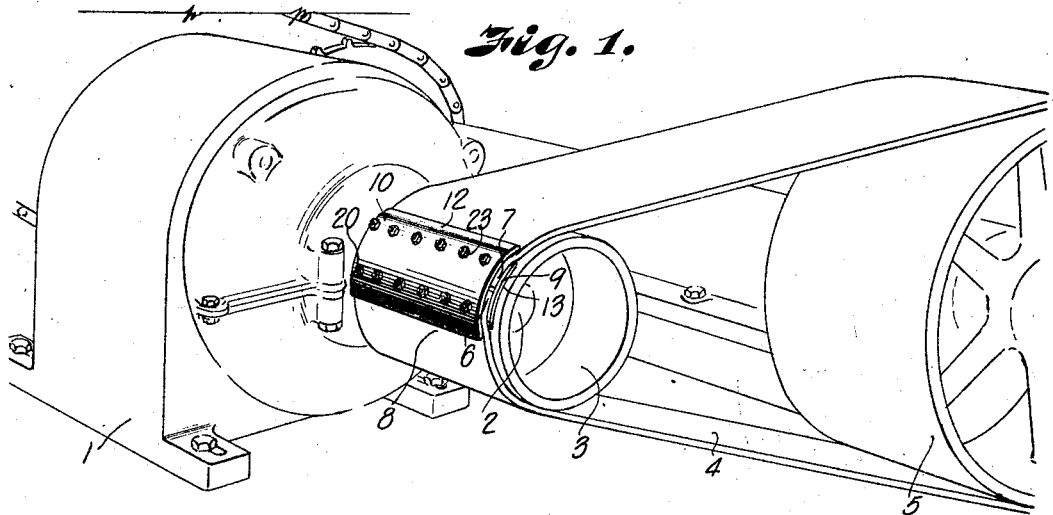
Fig. 1 is a perspective view of a belt operably mounted on driving and driven pulleys and connected with a clamp embodying my invention.
Figure 2:
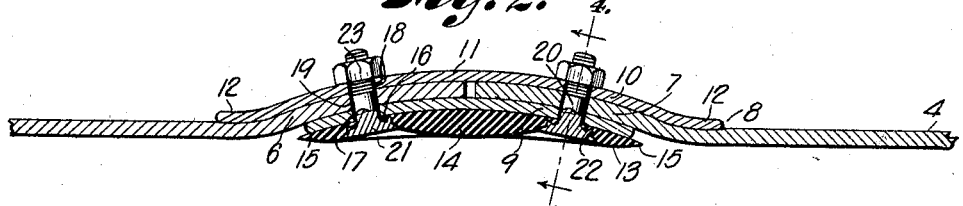
Fig. 2 is a cross section of the clamp on the line 2—2, Fig. 4, illustrating the clamping plates secured in operable relation with adjoining belt ends.

Referring more in detail to the drawings: 1 designates a motor and 2 a motor shaft whereon is fixed a driving pulley 3, operably connected through a belt 4 with a driven pulley 5.

In order to connect adjacent ends 6 and 7 of the belt I have provided an improved clamp generally designated 8 and including an inner plate 9 preferably having a curvature conforming to the outer curved face of the smallest pulley with which the clamp is intended to be used.

An outer plate 10, including a body portion 11 having a curvature complementary to the curvature of the inner plate 9, and preferably provided with extended inversely curved end portions 12 projecting beyond the ends of the inner plate, is adapted to overlie the belt ends on the side opposite the inner plate 9.

Mounted adjacent the inner plate for engaging the pulley rim is a cushioning pad or filler 13 preferably formed of rubber or other resilient material, and having a body portion 14, and tapered ends 15 projecting slightly beyond the ends of the plate 9.

Aligning openings 16 in the cushion, 17 and 18 in the inner and outer plates respectively, and 19 in the belt ends are adapted to receive bolts 20 having heads 21 preferably formed with integral projections or teeth 22 for firmly engaging the cushioning member, nuts 23 being threaded on the bolts for clamping the respective members together and for drawing the heads 21 into the pad 13 to prevent contact of the bolt heads with the pulley rim.

Figure 3:
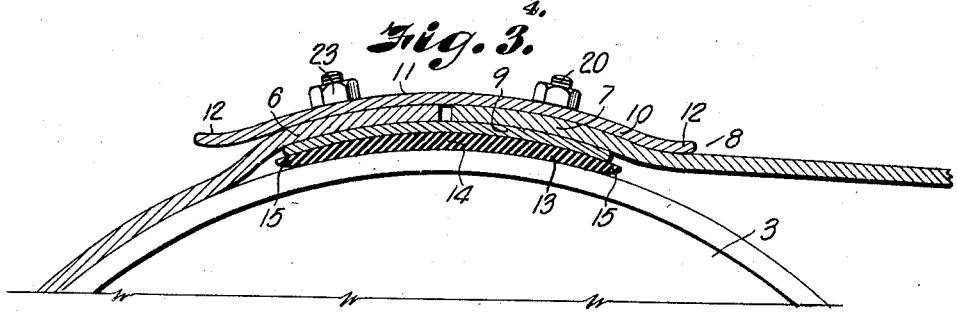
Fig. 3 is a cross section of the clamp on the line 3—3, Fig. 4, particularly illustrating the conformation of a filler or cushioning member to the curvature of a pulley.
Figure 4:
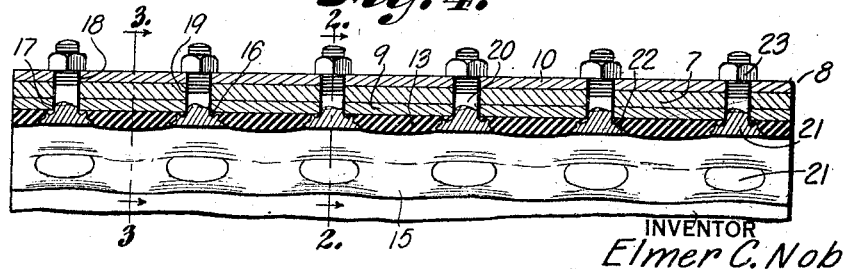
Fig. 4 is a longitudinal section of the clamp on the line 4—4, Fig. 2.

In driving an apparatus with a belt having ends connected with a clamp constructed and applied to the belt as described, the body portion of the cushioning member in coming into engagement with a pulley rim will assume a curvature similar to the pulley surface as illustrated in Fig. 3.

Due to the embedded position of the bolt heads in the cushioning member, only the resilient pad engages the pulleys, thereby eliminating noise and danger of slippage. The outer inversely curved ends of the outer plate prevent abrupt curvatures in the belt, thus prolonging the life and service of the belt.

If preferred, the cushioning pad or filler may be vulcanized or otherwise secured to the inner plate, or in some cases the filler may be used alone in conjunction with the outer plate if desired.

What I claim and desire to secure by Letters Patent is:

1. A belt fastener including an inner curved plate, an outer plate having a body portion curved on the arc of the inner plate and having reversely curved ends projecting beyond the ends of the inner plate, a cushioning member on the concave face of the inner plate, and means for securing the plates and cushioning member together and to the ends of a belt.

2. In a device of the character described for connecting the ends of belting, a curved inner plate overlying said ends, a relatively long outer plate overlying the opposite sides of said ends and having a complementary curved body portion and inversely curved end portions, a cushioning plate adjacent the inner curvature of and extending beyond the ends of the inner plate, and fastening means for securing said respective plates to the adjoining ends and having heads countersunk in the cushioning plates.

3. In combination with spaced pulleys and a belt adapted to run over said pulleys, means for joining the ends of the belt, including a curved inner plate overlying said ends, a relatively long outer plate overlying the opposite sides of said ends and having a complementary curved body portion and inversely curved end portions, a cushioning plate adjacent the inner curvature of the inner plate and having gradually tapered outer ends, and fastening means for securing said respective plates to the ends of the belt and having heads countersunk in the cushioning plates.

In testimony whereof I affix my signature.

ELMER C. NOBLE.